United States Patent
Choi et al.

(10) Patent No.: US 10,575,289 B2
(45) Date of Patent: Feb. 25, 2020

(54) METHOD AND APPARATUS FOR INDICATING RESOURCES FOR UPLINK CONTROL CHANNEL IN A MOBILE COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Seoul (KR); Taehyoung Kim, Seoul (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 75 days.

(21) Appl. No.: 15/971,041

(22) Filed: May 4, 2018

(65) Prior Publication Data
US 2018/0324788 A1 Nov. 8, 2018

(30) Foreign Application Priority Data
May 4, 2017 (KR) .................. 10-2017-0056827

(51) Int. Cl.
*H04W 72/04* (2009.01)
*H04L 5/14* (2006.01)

(52) U.S. Cl.
CPC ....... *H04W 72/0413* (2013.01); *H04L 5/1469* (2013.01); *H04W 72/0446* (2013.01)

(58) Field of Classification Search
CPC ......... H04W 72/0413; H04W 72/0446; H04W 76/14; H04L 5/1469; H04L 5/0053;
(Continued)

(56) References Cited

U.S. PATENT DOCUMENTS 9,750,055 B2 * 8/2017 Yamazaki ............. H04W 76/14
2014/0071862 A1 * 3/2014 Ji ......................... H04L 5/0037
370/280
(Continued)

FOREIGN PATENT DOCUMENTS

WO WO 2017/049463 3/2017

OTHER PUBLICATIONS

Guangdong OPPO Mobile Telecom, "Multiplexing of Short UCI and UL Data", R1-1704627, 3GPP TSG RAN WG1 Meeting #88bis, Apr. 3-7, 2017, 3 pages.
(Continued)

*Primary Examiner* — Vinncelas Louis
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of receiving uplink control information in a communication system. The method includes identifying a resource for receiving the uplink control information on a first uplink control channel from a terminal, transmitting first information associated with the resource to the terminal, transmitting second information associated with the resource to the terminal, and receiving the uplink control information on the uplink control channel based on the first information and the second information from the terminal.

15 Claims, 12 Drawing Sheets

(58) Field of Classification Search
CPC ..... H04L 5/005; H04L 1/0003; H04L 5/0037; H04B 7/0626
See application file for complete search history.

(56) References Cited

U.S. PATENT DOCUMENTS

2016/0269089 A1* 9/2016 Liu ................ H04B 7/0626
2018/0213524 A1   7/2018 Xiao et al.
2019/0215843 A1* 7/2019 Liu ................ H04L 1/0003

OTHER PUBLICATIONS

Sharp, "UCI Reporting on PUCCH and PUSCH", R1-1705475, 3GPP TSG RAN WG1 Meeting #88bis, Apr. 3-7, 2017, 3 pages.
LG Electronics, "Resource Configuration for Long NR-PUCCH", R1-1704910, 3GPP TSG RAN WG1 Meeting #88bis, Apr. 3-7, 2017, 5 pages.
Intel Corporation, "Long PUCCH Design Aspects", R1-1705031, 3GPP TSG RAN WG1 Meeting #88bis, Apr. 3-7, 2017, 5 pages.
International Search Report dated Aug. 7, 2018 issued in counterpart application No. PCT/KR2018/005187, 3 pages.

* cited by examiner

METHOD AND APPARATUS FOR INDICATING RESOURCES FOR UPLINK CONTROL CHANNEL IN A MOBILE COMMUNICATION SYSTEM

CROSS-REFERENCE TO RELATED APPLICATION(S)

This application is based on and claims priority under 35 U.S.C. § 119(a) to Korean Patent Application Serial No. 10-2017-0056827, which was filed on May 4, 2017 in the Korean Intellectual Property Office, the entire disclosure of which is incorporated herein by reference.

BACKGROUND

1. Field

The disclosure relates, generally, to an electronic device, and more particularly, to an electronic device configured for indicating uplink (UL) control channel resources in a wireless cellular communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

However, because the 5G communication system provides various slot formats, the number of UL orthogonal frequency division multiplexing (OFDM) symbols in one slot may vary.

SUMMARY

The disclosure has been made to address at least the disadvantages described above and to provide at least the advantages described below.

Accordingly, an aspect of the disclosure provides a method and apparatus that indicate, when the number of UL OFDM symbols varies according to a slot format, a transmission interval (or, start symbol and end symbol) of the long physical UL control channel (PUCCH) suitable for the number of UL OFDM symbols.

An aspect of the disclosure provides a method and apparatus that indicate, when UL control channels such as long PUCCH, short PUCCH and sounding reference signal (SRS) coexist in one TTI or one slot, the transmission interval (or, start symbol and end symbol) of the long PUCCH to avoid resource conflicts and maximize resource utilization.

In accordance with an aspect of the disclosure, there is provided a method of receiving UL control information in a communication system. The method includes identifying a resource for receiving the UL control information on a first UL control channel from a terminal, transmitting first information associated with the resource to the terminal, transmitting second information associated with the resource to the terminal, and receiving the UL control information on the UL control channel based on the first information and the second information from the terminal.

In accordance with an aspect of the disclosure, there is provided a method of transmitting UL control information in a communication system. The method includes receiving, from a base station, first information associated with a resource for transmitting the UL control information on a first UL control channel to the base station, receiving, to the base station, second information associated with the resource, identifying the resource for the first UL control channel based on the first information and the second information, and transmitting, to the base station, the UL control information on the first UL control channel on the identified resource.

In accordance with an aspect of the disclosure, there is provided a base station for receiving UL control information in a communication system. The base station includes a transceiver and a processor coupled with the transceiver and configured to identify a resource for receiving the UL control information on a first UL control channel from a terminal, transmit first information associated with the resource to the terminal, transmit second information associated with the resource to the terminal, and receive the UL control information on the UL control channel based on the first information and the second information from the terminal.

In accordance with an aspect of the disclosure, there is provided a terminal for transmitting UL control information in a communication system. The terminal includes a transceiver and at least one processor coupled with the transceiver and configured to receive, from a base station, first information associated with a resource for transmitting the UL control information on a first UL control channel to the base station, receive, from the base station, second information associated with the resource, identify the resource for the first UL control channel based on the first information and the second information, and transmit, to the base station, the UL control information on the first UL control channel on the identified resource.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
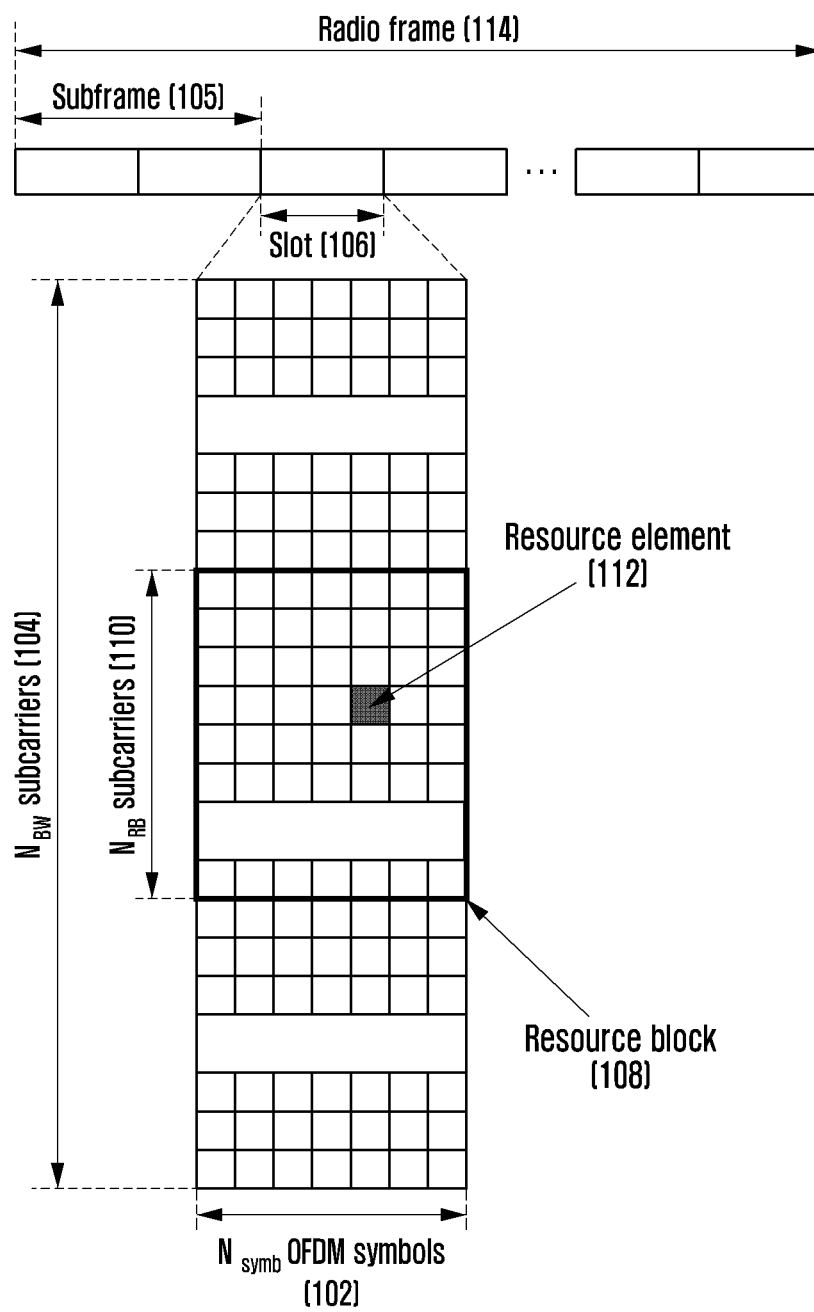
FIG. 1 is a diagram of a time-frequency domain in a long-term evolution (LTE) system, in accordance with an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

The following description of embodiments is focused on OFDM-based wireless communication systems and the 3GPP evolved universal mobile telecommunications system (UMTS) terrestrial radio access (EUTRA) standards. However, those skilled in the art will appreciate that the subject matter disclosed herein is applicable to other communication systems having similar technical backgrounds and channel configurations without significant modifications departing from the scope of the disclosure.

The 3rd generation partnership project (3GPP) has been working to standardize specifications for the long term evolution (LTE) system as a next generation mobile communication system. The LTE system aims to realize high-speed packet based communication supporting a data rate of about 100 Mbps.

The LTE system employs hybrid automatic repeat request (HARQ) to retransmit data at the physical layer when a decoding error has occurred in the initial transmission. HARQ is a scheme that enables the receiver having failed in decoding data to transmit information (negative acknowledgement (NACK)) indicating the decoding failure to the transmitter so that the transmitter can retransmit the corresponding data at the physical layer. The receiver may combine the retransmitted data with the previously received data for which decoding has failed, increasing data reception performance. When the data is correctly decoded, the receiver may transmit information (acknowledgement (ACK)) indicating successful decoding to the transmitter so that the transmitter can transmit new data.

FIG. 1 is a diagram of a time-frequency domain serving as radio resources to transmit data or control channels in the downlink (DL) of the LTE system, according to an embodiment.

In FIG. 1, the horizontal axis denotes the time domain and the vertical axis denotes the frequency domain. In the time domain, the minimum unit for transmission is OFDMA symbols, $N_{symb}$ OFDMA symbols 102 constitute one slot 106, and two slots constitute one subframe 105. The length of a slot is 0.5 ms and the length of a subframe is 1.0 ms. The radio frame (or frame) 114 is a time domain unit composed of 10 subframes. In the frequency domain, the minimum unit for transmission is subcarriers, and the total system transmission bandwidth is composed of $N_{BW}$ subcarriers 104.

The basic unit of resources in the time-frequency domain is a resource element (RE) 112. The RE may be represented by an OFDM symbol index and a subcarrier index. A resource block (RB) (or physical resource block (PRB)) 108 is defined by $N_{symb}$ consecutive OFDM symbols 102 in the time domain and $N_{RB}$ consecutive subcarriers 110 in the frequency domain. Hence, one RB 108 is composed of $N_{symb} \times N_{RB}$ REs 112. The minimum unit for data transmission is an RB. Normally, in the LTE system, $N_{symb}$ is set to 7 and $N_{RB}$ is set to 12, and the number of subcarriers NBW is proportional to the bandwidth of the system transmission band. The data rate may increase in proportion to the number of resource blocks scheduled for the terminal.

The LTE system defines and operates six transmission bandwidths. When a frequency-division duplex (FDD) system where DL and UL frequencies are separately used, the DL transmission bandwidth may differ from the UL transmission bandwidth. The channel bandwidth denotes a radio frequency (RF) bandwidth corresponding to the system transmission bandwidth. Table 1 illustrates a correspondence between the system transmission bandwidth and the channel bandwidth defined in the LTE system. For example, the transmission bandwidth of an LTE system having a channel bandwidth of 10MHz is composed of 50 resource blocks.

TABLE 1

| | Channel bandwidth $BW_{channel}$ MHz | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

In a subframe, N initial OFDM symbols are used to transmit DL control information. In general, N={1, 2, 3}. The value of N varies for each subframe according to the amount of control information to be transmitted at the current subframe. The control information may include a control channel transmission interval indicator indicating the number of OFDM symbols carrying control information, scheduling information for DL data or UL data, and HARQ ACK/NACK signals.

In an LTE system, scheduling information for DL data or UL data is transmitted by the base station to the terminal through DL control information (DCI). The UL refers to a radio link through which the terminal transmits data or a control signal to the base station, and the DL (DL) refers to a radio link through which the base station transmits data or a control signal to the terminal. Various DCI formats are defined. The DCI format to be used may be determined according to various parameters related to scheduling information for UL data (UL grant), scheduling information for DL data (DL grant), compact DCI with a small size, spatial multiplexing using multiple antennas, and power control DCI.

For example, DCI format 1 for scheduling information of DL grant is configured to include at least the following pieces of control information.

Resource allocation type 0/1 flag: this indicates whether the resource allocation scheme is of type 0 or type 1. Type 0 indicates resource allocation in units of resource block groups (RBG) by use of a bitmap. In the LTE system, the basic scheduling unit is an RB represented as a time-frequency domain resource. An RBG including multiple RBs is the basic scheduling unit for type 0. Type 1 indicates allocation of a specific RB in one RBG.

RB assignment: this indicates an RB allocated for data transmission. The resource represented by RB assignment is determined according to the system bandwidth and resource allocation scheme.

Modulation and coding scheme (MCS): this indicates the modulation scheme applied for data transmission and the transport block size (TBS) for data to be sent.

HARQ process number: this indicates the process number of the corresponding HARQ process.

New data indicator: this indicates either initial transmission or retransmission for HARQ.

Redundancy version: this indicates the redundancy version for HARQ.

TPC (transmit power control) command for PUCCH: this indicates a TPC command for the PUCCH being an UL control channel.

The DCI is channel coded, modulated, and transmitted through the physical DL control channel (PDCCH) or EPD-CCH (enhanced PDCCH).

In general, the DCI is channel coded for each terminal, and transmitted via an independent PDCCH. In the time domain, the PDCCH is mapped and transmitted during the control channel transmission interval. In the frequency domain, the mapping position of the PDCCH is determined by the identifier (ID) of each terminal and the PDCCH is dispersed across the overall system transmission bandwidth.

DL data is transmitted via the physical DL shared channel (PDSCH) serving as a physical DL channel. The PDSCH is transmitted after the control channel transmission interval. Scheduling information for the PDSCH such as mapping positions in the frequency domain or the modulation scheme is indicated by the DCI transmitted on the PDCCH.

The base station uses the 5-bit MCS field of control information constituting the DCI to indicate (or UE) the modulation scheme applied to the PDSCH (to be transmitted to UE) and the size of data to be transmitted (TBS) to the terminal. The TBS indicates the size of a TB before channel coding is applied for error correction.

Modulation schemes supported by the LTE system include QPSK (quadrature phase shift keying), 16QAM, and 64QAM, whose modulation order (Qm) is 2, 4 and 6, respectively. That is, it is possible to transmit 2, 4, and 6 bits per symbol by using QPSK, 16QAM, and 64QAM, respectively.

In 3GPP LTE Release 10, a bandwidth extension technique has been adopted to support higher data transmission rates compared to LTE Release 8. The above technique called bandwidth extension or carrier aggregation (CA) can extend the bandwidth and increase the amount of data transmission in proportion to the extended bandwidth compared with the LTE Release 8 terminal that transmits data in one band. Each of the bands is referred to as a component carrier (CC), and the LTE Release 8 terminal is specified to have one CC for each of the DL and the UL. The DL CC and the UL CC that are associated with each other via SIB-2 are referred to as a cell. The SIB-2 association between the DL component carrier and the UL component carrier is transmitted through a system signal or higher signal (or, higher layer signal). A terminal supporting CA can receive DL data and transmit UL data through a plurality of serving cells.

In LTE Release 10, when it is difficult for the base station to transmit the PDCCH via a given serving cell to a specific terminal, the base station may transmit the PDCCH via a different serving cell and set the carrier indicator field (CIF) to indicate that the PDCCH indicates the PDSCH or physical UL shared channel (PUSCH) of the different serving cell. The CIF may be set for a terminal supporting CA.

The CIF may indicate another serving cell by adding 3 bits to PDCCH information transmitted in a given serving cell. The CIF is included only when cross carrier scheduling is performed, and cross carrier scheduling is not performed when the CIF is not included. When the CIF is included in the DL assignment, it indicates the serving cell through which the PDSCH scheduled by the DL assignment is to be transmitted, and when the CIF is included in the UL grant, it indicates the serving cell through which the PUSCH scheduled by the UL grant is to be transmitted.

As described above, in LTE Release 10, CA is defined as a bandwidth extension technique, and a plurality of serving cells can be configured for the terminal. For data scheduling of the base station, the terminal periodically or non-periodically transmits channel information on the plurality of serving cells to the base station. The base station schedules data and transmits the data for each carrier, and the terminal transmits A/N feedback on the data received for each carrier. In LTE Release 10, the terminal can transmit A/N feedback of up to 21 bits, and when transmission of A/N feedback and transmission of channel information overlap in one subframe, the terminal may transmit the A/N feedback and discard the channel information. In LTE Release 11, by multiplexing one cell channel information together with A/N feedback, A/N feedback and one cell channel information (up to 22 bits) can be transmitted via PUCCH format 3 in the transmission resources of PUCCH format 3.

In LTE Release 13, it is possible to configure up to 32 serving cells by using not only the licensed band but also the unlicensed band. Considering that the number of licensed bands such as LTE system frequency is limited, a technology called LAA (licensed assisted access) has been introduced to provide LTE services in the unlicensed band such as the 5 GHz band. In LAA, LTE carrier aggregation is applied so that an LTE cell in the licensed band may operate as the primary cell (P cell) and an LAA cell in the unlicensed band may operate as a secondary cell (S cell). Hence, as in the LTE system, the feedback generated in the LAA cell being an S cell should be transmitted only via the P cell, and the DL subframe and the UL subframe can be freely configured in the LAA cell. Unless otherwise stated herein, LTE refers to all the evolved technologies of LTE such as LTE-A (LTE-advanced) and LAA.

As a post-LTE communication system, the fifth generation wireless cellular communication system (5G or NR) should be able to support services satisfying various requirements in consideration of various requirements of users and service providers. The 5G communication system aims to support various 5G type services such as enhanced mobile broadband (eMBB), massive machine type communication (mMTC), and ultra reliable and low latency communications (URLLC). These 5G type services may correspond to satisfying some of the requirements including a maximum transmission rate of 20 Gbps for the terminal, a maximum speed of 500 km/h for the terminal, a maximum latency of 0.5 ms, and a terminal density of 1,000,000 terminals/ $km^2$.

For example, to provide the eMBB service in the 5G communication system, the base station should be able to provide the terminal with a maximum transmission rate of 20 Gbps in the DL and a maximum transmission rate of 10 Gbps in the UL. At the same time, the average transmission rate of the terminal must also be increased for actual user experience. To meet such requirements, there is a need for improved transmission and reception techniques including advanced MIMO.

At the same time, mMTC is considered to support application services such as IoT in the 5G communication system. In mMTC, to efficiently provide IoT services, it is necessary to support a very large number of terminals in a cell, extend the coverage of the terminal, lengthen the battery time, and reduce the cost of the terminal. The IoT must be able to support a very large number of terminals (e.g., 1,000,000 terminals/$km^2$) in a cell to provide a communication service to sensors and components attached to various devices. In addition, due to the nature of the service, mMTC is more likely to cover shadow areas such as the basement of a building and a region that a cell cannot cover, thus requiring a coverage wider than that provided by eMBB. Low-cost terminals are likely to be used in mMTC, and a very long battery lifetime is required because it is difficult to frequently replace the battery of a terminal.

URLLC, as cellular-based wireless communication for a specific purpose, is a service usable for remote control of robots or machinery, industrial automation, unmanned aerial vehicles, remote health control, and emergency notification, and should enable ultra-reliable and low-latency communication. For example, a URLLC service may have to support both a maximum delay time of less than 0.5 ms and a packet error rate of $10^{-5}$ or less as a requirement. Hence, for the URLLC, the TTI should be shorter than that of the 5 G eMBB service, and resources should be allocated in a wide frequency band.

The services considered in the 5G wireless cellular communication system described above should be provided as a single framework. That is, for efficient resource management and control, it is desirable that the individual services be integrated, controlled and transmitted via one system rather than being operated independently.

Figure 2:
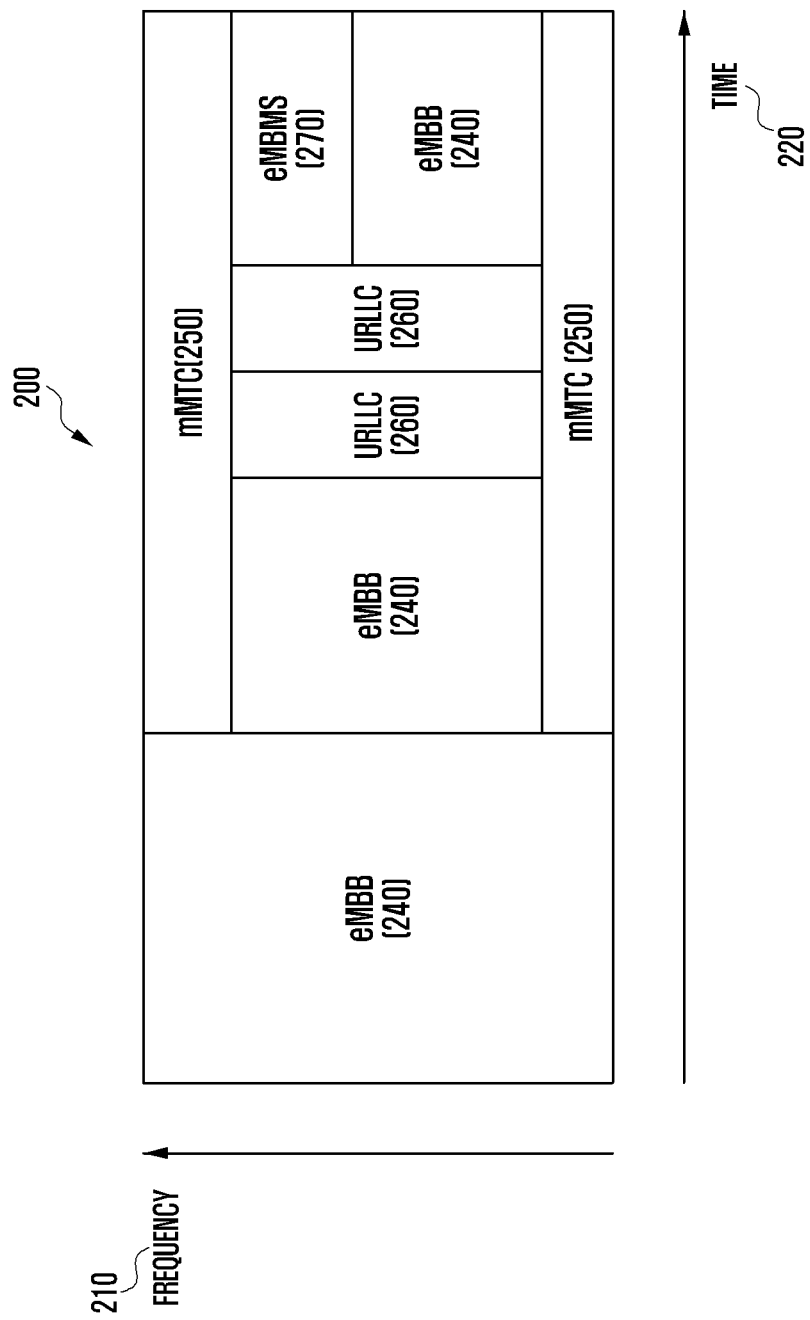
FIG. 2 is a diagram of 5G services that are multiplexed and transmitted in a system, in accordance with an embodiment.

FIG. 2 is a diagram of 5G services that are multiplexed and transmitted in a system, in accordance with an embodiment.

In FIG. 2, a frequency-time resource 200 used in the 5G communication system may be composed of the frequency axis 210 and the time axis 220. The 5G communication system operates eMBB 240, mMTC 250, and URLLC 260 within one framework. As a service that can be additionally considered in the 5G communication system, there is enhanced mobile broadcast/multicast service (eMBMS) 270 for providing a cellular based broadcasting service. Those services considered in the 5G communication system, such as eMBB 240, mMTC 250, URLLC 260 and eMBMS 270, may be multiplexed and transmitted through time division multiplexing (TDM) or frequency division multiplexing (FDM) within a single system frequency bandwidth operated in the 5G communication system. Spatial division multiplexing may also be applied.

For eMBB 240, to provide the increased data transmission rate described before, it may prove advantageous to occupy a maximum frequency bandwidth at a specific time for transmission. Hence, the eMBB service 240 may be time division multiplexed (TDMed) with other services within the system transmission bandwidth 200 for transmission. It is also preferable that the eMBB service 240 is frequency division multiplexed (FDMed) with other services within the system transmission bandwidth 200 for transmission depending on the needs of other services.

For mMTC 250, unlike other services, an increased transmission interval is required to secure wide coverage, and the coverage can be secured by repetitively transmitting the same packet within the transmission interval. At the same time, to reduce the complexity and cost of the terminal, the transmission bandwidth available to the terminal is limited. Considering these requirements, it may prove advantageous that mMTC 250 is FDMed with other services within the system transmission bandwidth 200 for transmission.

For URLLC 260, to satisfy the ultra-low latency requirement, it may prove advantageous to have a shorter TTI compared with other services. At the same time, as a low coding rate is needed to satisfy the ultra-reliability requirement, a wide bandwidth in the frequency domain may be used. Considering these requirements, the URLLC 260 may be TDMed with other services within the system transmission bandwidth 200 for transmission.

The individual services described above may have different transmission and reception techniques and parameters to meet their requirements. For example, each service may have a different numerology depending on its service requirement. The numerology may include information regarding a cyclic prefix (CP) length, a subcarrier spacing, a length of an OFDM symbol, and the TTI in a communication system based on OFDM or OFDMA.

As an example of different numerologies between the above services, eMBMS 270 may have a longer CP length compared to other services. Since the eMBMS transmits broadcast-based higher layer traffic, the same data can be transmitted in all cells. If signals of plural cells arrive at the terminal within a delay of CP length, as the terminal can receive and decode all of these signals, a single frequency network (SFN) gain can be obtained. Hence, a terminal located at the cell boundary can receive broadcast information without coverage restriction. However, if a longer CP length is used for the eMBMS in the 5G communication system, the CP overhead may cause waste; this may require the use of a longer OFDM symbol length and a narrower subcarrier spacing in comparison to other services.

As another example of different numerologies between the services in the 5G communication system, since URLLC requires a shorter TTI compared to other services, a shorter OFDM symbol length and a wider subcarrier spacing may be used.

In the 5G communication system, one TTI may be defined as one slot and may be composed of 14 OFDM symbols or 7 OFDM symbols. When a subcarrier spacing of 15 KHz, one slot will have a length of 1 ms or 0.5ms. For emergency transmission or unlicensed band transmission in the 5G communication system, one TTI may be defined as one mini-slot or sub-slot, and one mini-slot may have one OFDM symbol to K-1 OFDM symbols (K can equal the number of OFDM symbols in the slot). If the length of one slot is 14 OFDM symbols, the length of a mini-slot can be determined from 1 to 13 OFDM symbols. The length of the slot or mini-slot may be specified by the standard or may be indicated to the terminal via a higher layer signal or system information.

The slot or mini-slot can be defined to have various transmission formats, and can be classified in accordance with the following:

DL only slot or full DL slot; this slot includes a DL section only and supports DL transmission only;

DL centric slot; this slot is composed of a DL section, a guard period (GP), and an UL section, and the number of OFDM symbols in the DL section is larger than that in the UL section;

UL centric slot; this slot is composed of a DL section, a GP, and an UL section, and the number of OFDM symbols in the downlink section is smaller than that in the UL section; and UL only slot or full UL slot; this slot includes an UL section only and supports UL transmission only.

In the above description, while only the slot format is classified, the mini-slot can be classified in the same manner. That is, the mini-slots can be classified into DL only mini-slot or full DL mini-slot, DL centric mini-slot, UL centric mini-slot, UL only mini-slot or full UL mini-slot.

The transmission interval (or transmission start symbol and transmission end symbol) of the UL control channel may be changed according to the format of the slot or mini-slot. Also, it may be to consider a case where the UL control channels are multiplexed within one slot. For example, the UL control channel having a short transmission interval for minimizing the transmission delay (short PUCCH) and the UL control channel having a long transmission interval (long PUCCH) may coexist in one slot, and an uplink sounding signal such as a sounding reference signal (SRS) may also be transmitted in the same slot.

When the terminal is scheduled to transmit the UL control channel, there is a need for a method for transmitting the UL control channel when the number of UL OFDM symbols changes according to the slot format. There is also a need for a method for preventing transmission resources of the UL control channel from colliding with each other while maximizing utilization of time-frequency resources of the base station. To enable the base station and the terminal to transmit and receive the UL control channel in a slot or mini-slot, the disclosure provides a method and apparatus that indicate an interval of the UL control channel (or start symbol and end symbol) to the terminal and enable the terminal to transmit the UL control channel in the slot or mini-slot.

Figure 3A:
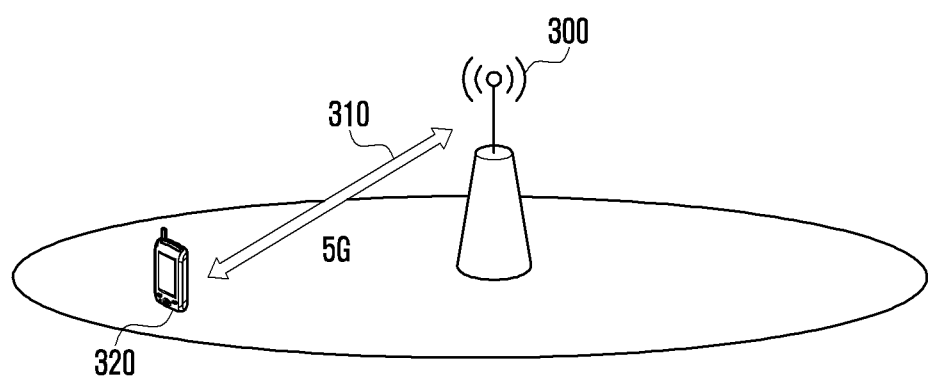
FIG. 3A is a diagram of a communication system, in accordance with an embodiment.

FIG. 3A is a diagram of a communication system, in accordance with an embodiment.

A base station 300 of the network operates a 5G cell 310. A terminal 320 is a 5G capable terminal having a 5G transceiver module. The terminal 320 acquires synchronization through a synchronization signal transmitted from the 5G cell 310, receives system information, and transmits and receives data to and from the base station 300 through the 5G cell 310; there is no limitation on a duplex mode of the 5G cell 310. The UL control transmission is performed through the 5G cell 310 when the 5G cell 310 is a P cell. The system of FIG. 3A may have a plurality of serving cells and may support a total of 32 serving cells. The base station 300 can have a 5G transceiver module (or system), and the base station 300 can manage the 5G system in real time.

Figure 3B:
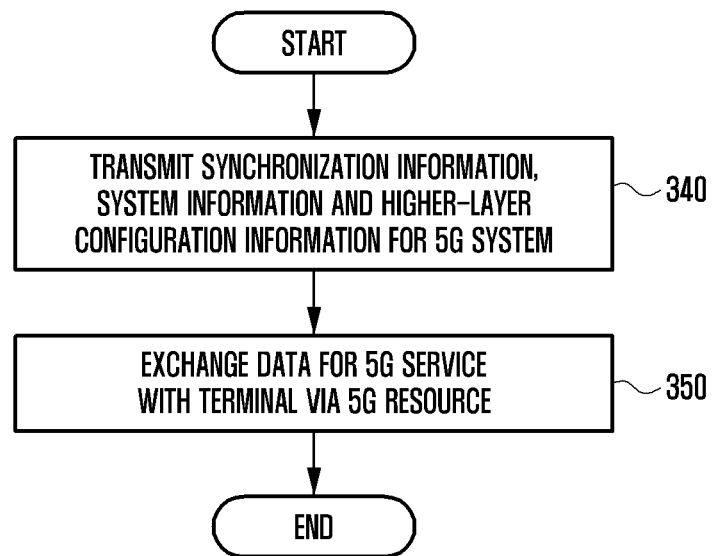
FIGS. 3B and 3C are flowcharts of a method of transmitting and receiving data between a base station and a terminal in a 5G communication system, in accordance with an embodiment.
Figure 3C:
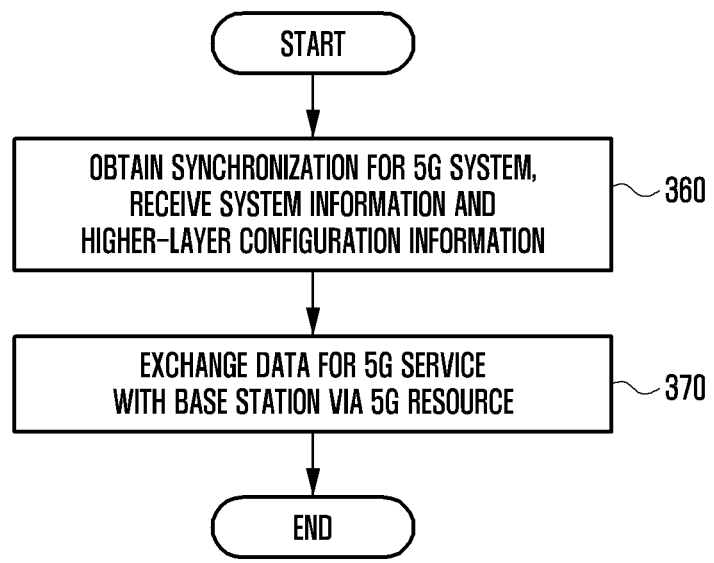

FIGS. 3B and 3C are flowcharts of a method of transmitting and receiving data between the base station 300 and the terminal 320 in a 5G communication system, in accordance with an embodiment.

In FIG. 3B, the base station 300 configures 5G resources and exchanges data with the 5G capable terminal 320 via the resources for the 5G system.

At step 340, the base station 300 transmits synchronization and system information for the 5G system and higher-layer configuration information to the terminal 320. For the 5G system synchronization signal, separate synchronization signals may be transmitted for eMBB, mMTC, and URLLC using different numerologies, or a common synchronization signal may be transmitted via a specific 5G resource by using one numerology. For system information, a common system signal can be transmitted via a particular 5G resource by using one numerology, or separate pieces of system information can be transmitted for eMBB, mMTC and URLLC using different numerologies. The system information and higher-layer configuration information may include configuration information relating to a slot or a mini-slot, which may be used for data transmission and reception, a number of OFDM symbols in a slot or mini-slot, and the numerology. Additionally, when a DL common control channel is set for the terminal 320, the system information and higher-layer configuration information may include configuration information related to reception of the DL common control channel.

At step 350, the base station 300 transmits and receives data for the 5G service to and from the terminal 320 via the 5G resource.

In FIG. 3C the terminal 320 receives 5G resource configuration information from the base station 300 and transmits and receives data via the 5G resource.

At step 360, the terminal 20 acquires synchronization based on the synchronization signal for the 5G system transmitted by the base station 300 and receives system information and higher-layer configuration information from the base station 300. For the 5G system synchronization signal, separate synchronization signals may be transmitted for eMBB, mMTC, and URLLC using different numerologies, or a common synchronization signal may be transmitted via a specific 5G resource by using one numerology. For system information, a common system signal can be transmitted via a particular 5G resource by using one numerology, or separate pieces of system information can be transmitted for eMBB, mMTC and URLLC using different numerologies. The system information and higher-layer configuration information may include configuration information relating to a slot or a mini-slot, which may be used for data transmission and reception, a number of OFDM symbols in a slot or mini-slot, and the numerology. Additionally, when a DL common control channel is set for the terminal, the system information and higher-layer configuration information may include configuration information related to reception of the DL common control channel.

At step 370, the terminal 320 transmits and receives data for the 5G service to and from the base station 300 via the 5G resource.

A description is given of a long PUCCH transmission method capable of preventing resource collision and maximizing resource utilization when the UL control channels such as long PUCCH, short PUCCH, and SRS coexist in one TTI or one slot in a situation where the 5G system of FIG. 3 operates based on a slot or a mini-slot. This method is based on a scheme for indicating the transmission interval (or start symbol and end symbol) of the long PUCCH.

Figure 4A:
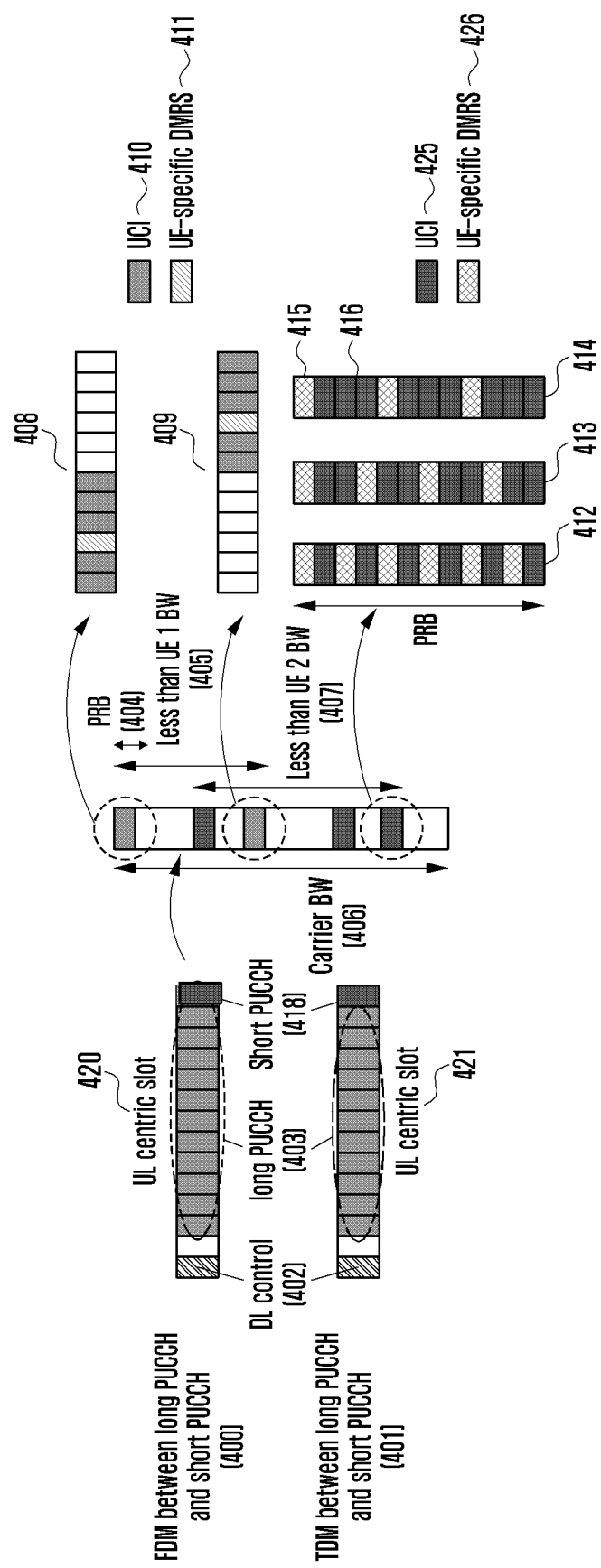
FIGS. 4A and 4B are diagrams of slot configurations, in accordance with an embodiment.
Figure 4B:
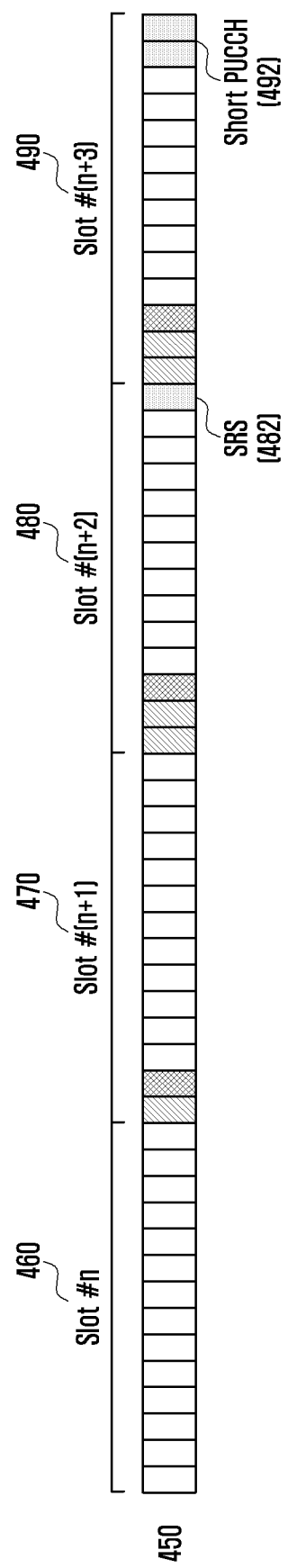

FIGS. 4A and 4B are diagrams of slot configurations, in accordance with an embodiment.

In FIGS. 4A and 4B, a description is given of a scheme that enables a terminal to determine the transmission interval (or start symbol and end symbol) of the long PUCCH based on a slot and to transmit the UL control channel. However, this scheme may also be applicable to the case where the terminal determines the transmission interval (or start symbol and end symbol) of the long PUCCH based on a mini-slot and transmits the UL control channel.

In FIG. 4A, the long PUCCH and the short PUCCH are multiplexed in the frequency domain (FDM) as indicated by 400 or multiplexed in the time domain (TDM) as indicated by 401. A description is given of a slot structure in which the long PUCCH and the short PUCCH are multiplexed 420 or 421 indicate a slot, which is a basic unit for transmission in the 5G system (also referred to as a subframe or a TTI, and the basic unit for transmission is assumed to be a slot as previously described herein), i.e., an UL centric slot whose symbols are mainly UL symbols. All or most of the OFDM symbols of the UL centric slot are used for the UL. Several initial or final OFDM symbols of the UL centric slot may be used for the UL. If both DL symbols and UL symbols are present in one slot, a transmission gap may exist between the DL symbols and the UL symbols. In the UL centric slot 420 or 421, the first OFDM symbol is used for DL transmission (e.g., DL control channel transmission 402), the second OFDM symbol is used as a transmission gap, and the third and subsequent OFDM symbols are used for UL transmission. For UL transmission, UL data channel transmission and UL control channel transmission are possible.

Next, a description is given of the long PUCCH 403. Since the control channel of a long transmission period is used to extend the cell coverage, it can be transmitted via Discrete Fourier Transform-spread-OFDM (DFT-S-OFDM) being a single carrier transmission scheme rather than OFDM transmission. Hence, the long PUCCH should be transmitted using only consecutive subcarriers. In addition, to obtain a frequency diversity effect, UL control channels of a long transmission period may be configured at some distance apart as indicated by 408 and 409.

In the frequency domain, a distance 405 between the resources constituting the long PUCCH can be smaller than the bandwidth supported by the terminal. The long PUCCH in the front part of the slot may be transmitted by using PRB-1 as indicated by 408, and the long PUCCH in the rear part of the slot may be transmitted by using PRB-2 as indicated by 409. The PRB 404 is a minimum transmission unit in the frequency domain, and can be defined by 12 subcarriers or the like. The frequency domain distance between PRB-1 and PRB-2 can be smaller than the maximum supported bandwidth of a terminal, and the maximum supported bandwidth of the terminal may be less than or equal to the bandwidth (406) supported by the system.

The frequency resources PRB-1 and PRB-2 may be configured for the terminal via a higher-layer signal. Each frequency resource may be mapped to a bit field via a higher-layer signal, and the bit field included in the DL control channel may indicate the frequency resource to be used to the terminal. The control channel transmitted in the front part of the slot 408 and the control channel transmitted in the rear part of the slot 409 are composed of UL control information (UCI) 410 and a terminal-specific reference signal 411. It is assumed that these two signals are separated in time and transmitted via different OFDM symbols.

A description is given of the short PUCCH 418. The short PUCCH can be transmitted via both the DL centric slot and the UL centric slot. The short PUCCH is typically transmitted by the last symbol of the slot, or by an OFDM symbol in the rear part (e.g., last OFDM symbol, last but one OFDM symbol, or last two OFDM symbols). It is also possible that the short PUCCH is transmitted at an arbitrary position in the slot. The short PUCCH may be transmitted by using one or more OFDM symbols.

In FIG. 4A, the short PUCCH is transmitted by the last symbol 418 of the slot. The radio resources for the short PUCCH are allocated in units of PRBs in the frequency domain. For the short PUCCH, a plurality of consecutive PRBs may be allocated, or a plurality of PRBs spaced apart in the frequency band may be allocated. The allocated PRB should be included in a frequency band narrower than or equal to the bandwidth 407 supported by the terminal. The multiple PRBs as frequency resources may be configured for the terminal via a higher-layer signal. Each frequency resource may be mapped to a bit field via a higher-layer signal, and the bit field included in the DL control channel may indicate the frequency resource to be used to the terminal.

Within one PRB, the UL control information 425 and demodulation reference signal 426 should be multiplexed in the frequency band. The demodulation reference signal may be transmitted on one subcarrier per every two symbols as indicated by 412, transmitted on one subcarrier per every three symbols as indicated by 413, or transmitted on one subcarrier per every four symbols as indicated by 413. The scheme for demodulation signal transmission as indicated by 412, 413, or 414 may be configured by a higher-layer signal. The terminal may multiplex the demodulation reference signal and the UL control information and transmit the multiplexed signal according to the scheme indicated by the received higher-layer signal.

Alternatively, the scheme for transmitting the demodulation reference signal may be determined according to the number of bits of the UL control information 425. For example, if the number of bits of the UL control information is small, the terminal can transmit the UL control information and the demodulation reference signal via the short PUCCH by multiplexing the demodulation reference signal and the UL control information in a manner indicated by 412. When the number of bits of the UL control information is small, a sufficient transmission code rate can be obtained without using a large amount of resources for transmission of UL control information. For example, if the number of bits of the UL control information is large, the terminal can transmit the UL control information and the demodulation reference signal by multiplexing the demodulation reference signal and the UL control information in a manner indicated by 414. When the number of bits of the UL control information is large, it is necessary to use a large amount of resources for transmission of the UL control information in order to lower the transmission code rate.

A description is given of an example for multiplexing the long PUCCH and the short PUCCH. A long PUCCH and a short PUCCH of different terminals may be multiplexed in the frequency domain within one slot 420 as indicated by 400. Here, the base station may configure the frequency resources for the short PUCCH and the long PUCCH of different terminals so that they do not overlap as in the case of PRBs in FIG. 4. However, configuring different transmission resources in the frequency domain for UL control channels of different terminals regardless of scheduling is a waste of frequency and is not appropriate considering that limited frequency resources should be used for UL data channel transmission rather than UL control channel transmission.

Hence, short PUCCH and long PUCCH frequency resources of different terminals may overlap, and the base station should ensure that different terminals do not experience a scheduling conflict or transmission resource collision in one slot. When a collision between short PUCCH transmission resources and long PUCCH transmission resources of different terminals cannot be avoided in a specific slot, the base station needs a mechanism to prevent such a collision and the terminal needs to adjust the long PUCCH transmission resources according to the direction of the base station. As such, the long PUCCH transmission resource and the short PUCCH transmission resource may be multiplexed in the frequency domain within one slot 421 as indicated by 401.

FIG. 4B shows an example in which the number of UL OFDM symbols for long PUCCH transmission may be different for each slot. A description is given of a case where the number of UL OFDM symbols for long PUCCH transmission is different from slot to slot with reference to FIG. 4B. The slot format of a specific slot may be determined by the base station and may be indicated to the terminal via the DL control channel. Hence, the slot format may be transmitted in each slot as indicated by 450. For example, slot #n (460) has 14 UL OFDM symbols; slot #(n+1)(470) has 12 UL OFDM symbols; although slot #(n+2)(480) has 11 UL OFDM symbols, as the last UL OFDM symbol is used for SRS transmission 482, 10 UL OFDM symbols can actually be used for long PUCCH transmission; and although slot #(n+3)(490) has 11 UL OFDM symbols, as the last two UL OFDM symbols are used for short PUCCH transmission 492, 9 UL OFDM symbols can actually be used for long PUCCH transmission. As described above, the number of UL OFDM symbols available to long PUCCH transmission in each slot may vary depending on the number of UL OFDM symbols given in the slot format and transmission of other UL control channels such as short PUCCH and SRS.

The disclosure provides methods for long PUCCH transmission without regard to the number of UL OFDM symbols in one slot that varies depending upon the number of UL OFDM symbols given by the slot format or transmission of UL control channels in a short duration such as short PUCCH or SRS.

In a first method, the base station directly indicates the long PUCCH transmission resource in one slot via a first signal to the terminal. The terminal performs long PUCCH transmission via the transmission resource indicated in one slot by the received first signal, or the terminal performs long PUCCH transmission via the transmission resource implicitly (or indirectly) indicated by a specified rule associating the long PUCCH transmission resource with the number of UL OFDM symbols, the number of DL OFDM symbols, and the number of GP OFDM symbols in the slot. The first signal may be a higher-layer signal or a physical-layer signal. The first signal includes information for long PUCCH transmission indicating an OFDM symbol interval (or, start OFDM symbol and end OFDM symbol) in the time domain and a PRB in the frequency domain.

If long PUCCH transmission with an OFDM symbol interval set implicitly or by the first signal is not possible owing to reception of a third signal indicating that SRS or short PUCCH transmission of another terminal is transmitted at a specific OFDM symbol of the slot, the terminal may discard the long PUCCH transmission. Alternatively, the terminal determines the number of overlapping OFDM symbols between the OFDM symbols for long PUCCH transmission and the OFDM symbols for SRS or short PUCCH transmission. If the number of overlapping OFDM symbols is less than a preset threshold, the terminal may perform long PUCCH transmission after puncturing the overlapping OFDM symbols. Otherwise, the terminal may discard the long PUCCH transmission. Alternatively, the terminal may also perform long PUCCH transmission after puncturing those OFDM symbols overlapping the OFDM symbols for SRS or short PUCCH transmission. The third signal and the threshold may be configured by a higher-layer signal, and the threshold may be a constant indicating a specific number of OFDM symbols.

In a second method, the base station indicates the transmission resource for the long PUCCH in one slot directly to the terminal through a first signal and a second signal. The terminal performs long PUCCH transmission on the transmission resource in one slot indicated by the received first signal and second signal. Here, the first signal may be a higher-layer signal, and the second signal may be a physical-layer signal. The first signal may indicate a set of OFDM symbol intervals (or start OFDM symbol and end OFDM symbol) in the time domain and PRBs in the frequency domain being available for long PUCCH transmission, and the second signal may indicate a selected entry of the set.

In a third method, the base station directly or indirectly indicates the long PUCCH transmission resource in one slot in advance through a first signal or a specified rule associating the long PUCCH transmission resource with the number of UL OFDM symbols, the number of DL OFDM symbols, and the number of GP OFDM symbols in the slot to the terminal, and reduces or adjusts the previously indicated long PUCCH transmission resource in one slot through a second signal to avoid a collision with the UL control channel transmission resource of a short time period. The terminal determines in advance the transmission interval of the long PUCCH based on the received first signal or the number of UL, DL and GP OFDM symbols in the slot, and performs long PUCCH transmission in one slot while adjusting the long PUCCH transmission resource in one slot based on the received second signal. The first signal and the second signal may be a higher-layer signal, a physical-layer signal, or a combination thereof. The first signal may indicate an OFDM symbol interval (or start OFDM symbol and end OFDM symbol) in the time domain and a PRB in the frequency domain available for long PUCCH transmission, and the second signal may indicate an OFDM symbol interval (or start OFDM symbol and end OFDM symbol) in the time domain and a PRB in the frequency domain unavailable for long PUCCH transmission in one slot.

The first method is suitable for UL control channel transmission configured for the terminal to perform periodic channel information transmission without a scheduling grant. The second and third methods are suitable for UL control channel transmission configured for the terminal to perform aperiodic HARQ-ACK transmission according to a scheduling grant. Hence, the first method, and the second or third method may be applied depending on whether the UL control channel to be transmitted by the terminal is triggered by the scheduling grant, and whether the UL control information to be transmitted is periodic channel information or HARQ-ACK. That is, the terminal may apply the first method to the transmission of the UL control channel configured to be transmitted without a scheduling grant. The terminal may apply the second or third method to the transmission of the UL control channel whose transmission is triggered by the scheduling grant. Alternatively, the terminal may apply the first method to the transmission of the UL control channel carrying periodic channel information, and the terminal may apply the second or third method to the transmission of the UL control channel carrying HARQ-ACK information.

The terminal may also be configured to determine whether to apply the first method, the second method, or the third method through a higher-layer signal. Upon receiving a higher-layer signal as a setting signal for applying the first method, the terminal may always transmit the UL control channel by applying the first method.

Upon receiving a higher-layer signal as a setting signal for applying the second method, the terminal may always transmit the UL control channel by applying the second method. Upon receiving a higher-layer signal as a setting signal for applying the third method, the terminal may always transmit the UL control channel by applying the third method.

Next, a description is given of detailed examples for the first, second and third methods. The examples described below are not mapped in sequence with the methods described above. For instance, the second example may be related to the first method.

In a first example, the DL control channel is used to indicate an OFDM symbol interval for long PUCCH transmission (or, start and end OFDM symbols, or OFDM symbols unavailable to long PUCCH transmission) to the terminal. The DL control channel may be common information for all terminals in a group or a cell, or may be dedicated information destined for a specific terminal. For instance, when the frequency resource for long PUCCH transmission of the terminal collides with the frequency resource for short PUCCH transmission of another terminal at the last OFDM symbol of the slot, the base station can prevent the long PUCCH transmission interval from including the last OFDM symbol of the slot. When the long PUCCH transmission interval is supported by four to twelve OFDM symbols (e.g., the UL interval of the UL centric slot 420 in FIG. 4A includes 12 OFDM symbols), the base station may indicate long PUCCH transmission using 11 OFDM symbols instead of using 12 OFDM symbols via a bit field of the DL control channel, and the terminal may transmit the long PUCCH using 11 OFDM symbols.

When the long PUCCH transmission interval is set as a set of limited OFDM symbols through a higher-layer signal or a specification rule (e.g., a higher-layer signal or a specification rule indicates that the long PUCCH transmission interval is available only for 4, 6, 8, 10, 12 OFDM symbols), to avoid a collision with the short PUCCH transmission resource at the last OFDM symbol, the base station may indicate that the long PUCCH transmission is possible for 10 OFDM symbols through a bit field of the DL control channel, and the terminal may perform long PUCCH transmission using 10 OFDM symbols.

Alternatively, the base station may avoid a resource conflict with the long PUCCH by indicating the short PUCCH transmission interval (e.g., indicating whether the short PUCCH transmission interval includes the last OFDM symbol, the last but one OFDM symbol, or the last two OFDM symbols in the slot) to the terminal.

In a second example, a higher-layer signal is used to indicate an OFDM symbol interval for long PUCCH transmission (or, start and end OFDM symbols, or OFDM symbols unavailable to long PUCCH transmission) to the terminal. The frequency resources for short PUCCH transmission may be configured as distributed PRBs or as localized PRBs. When the frequency resources for short PUCCH transmission are configured as distributed PRBs, there is a high probability of a collision with the long PUCCH transmission resource. Hence, the base station may configure the OFDM symbol interval for long PUCCH transmission so that it does not include the OFDM symbols used for short PUCCH transmission (e.g., the last OFDM symbol) via a higher-layer signal. For instance, the base station may indicate that the long PUCCH transmission is possible for 10 OFDM symbols through a higher-layer to the terminal, and the terminal may perform long PUCCH transmission using 10 OFDM symbols.

In a third example, a higher-layer signal or physical DL control signal is configured for the terminal to determine whether to perform long PUCCH transmission or short PUCCH transmission, and the OFDM symbol interval for long PUCCH transmission is associated with the number of UL OFDM symbols indicated by the slot format. The base station indicates information on whether the last 1 or 2 OFDM symbols are available to long PUCCH transmission to the terminal. The terminal may determine whether to transmit a long PUCCH or a short PUCCH based on the received configuration information. Upon determining to perform long PUCCH transmission, the terminal may determine whether the last 1 or 2 OFDM symbols are also usable for the long PUCCH transmission based on the received indication information. For instance, assuming that the UL OFDM symbol interval of the slot includes 11 OFDM symbols, the terminal may determine that that 11 OFDM symbols are available to long PUCCH transmission based on the UL OFDM symbol interval of the slot, and may determine whether to perform long PUCCH transmission via 11 OFDM symbols, 10 OFDM symbols, or 9 OFDM symbols based on the received indication information. To perform long PUCCH transmission via 10 OFDM symbols or 9 OFDM symbols, the long PUCCH symbols may be punctured from the end with respect to long PUCCH transmission via 11 OFDM symbols or be rate-matched. The terminal may receive information on the UL OFDM symbol interval of the slot via the DL control channel. The DL control channel may be common information for all terminals in a group or a cell, or may be dedicated information destined for a specific terminal.

Figure 5A:
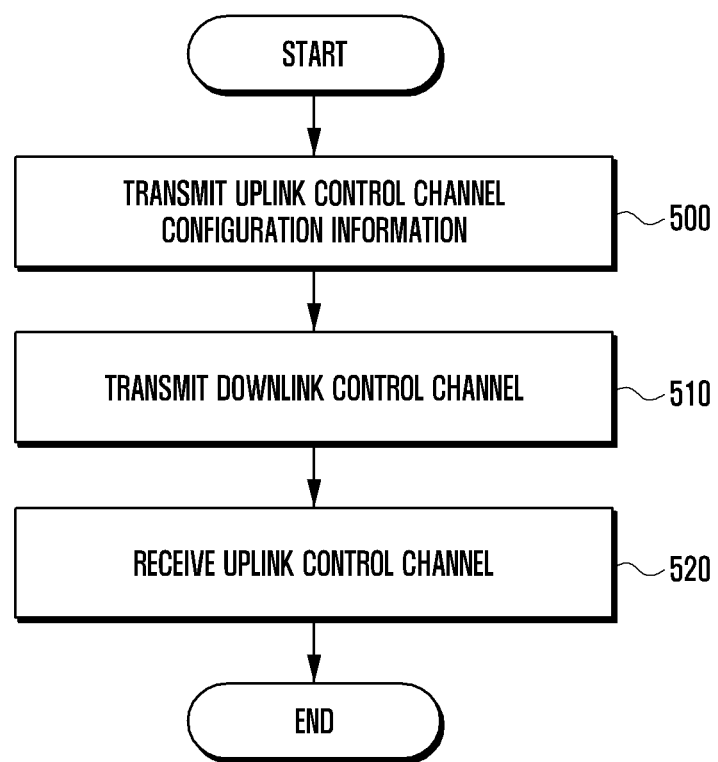
FIGS. 5A and 5B are flowcharts of a method of transmitting and receiving data between a base station and a terminal in a 5G communication system, in accordance with an embodiment.
Figure 5B:
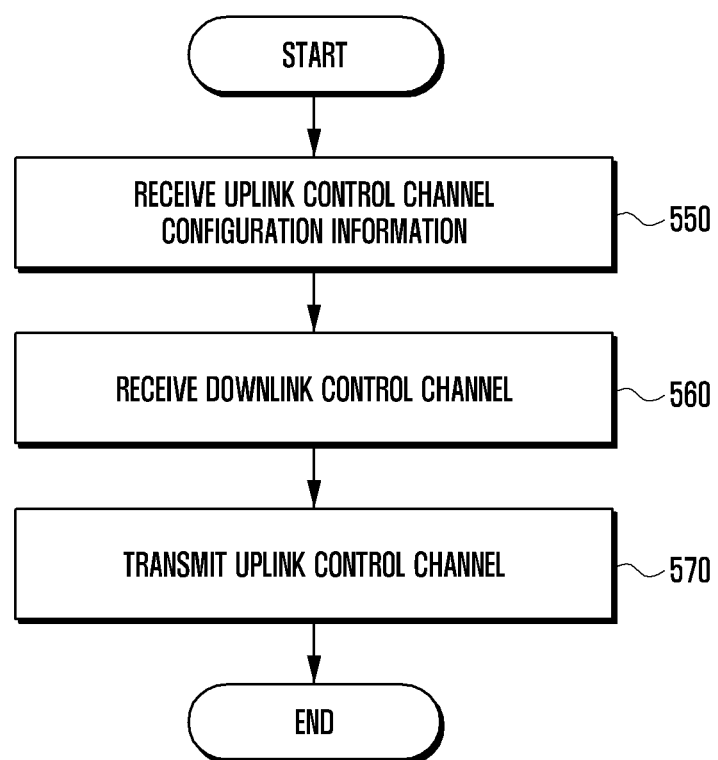

FIGS. 5A and 5B are flowcharts of a method of transmitting and receiving data between a base station and a terminal in a 5G communication system, in accordance with an embodiment.

In FIG. 5A, at step 500, a base station transmits UL control channel configuration information to a terminal. As described above in connection with FIGS. 4A and 4B, the UL control channel configuration information may indicate a set of OFDM symbol intervals in the time domain and PRBs in the frequency domain available for long or short PUCCH transmission, and may be transmitted to the terminal via a higher-layer signal so as to avoid a collision between short PUCCH transmission resources and long PUCCH transmission resources of different terminals.

At step 510, the base station transmits a DL control channel to the terminal. As described above in connection with FIGS. 4A and 4B, the DL control channel may include a bit field that indicates an OFDM symbol interval (or start OFDM symbol and end OFDM symbol) in the time domain and a PRB in the frequency domain available to the short PUCCH or the long PUCCH and OFDM symbols unavailable to the long PUCCH transmission, and may be transmitted to the terminal so as to avoid a collision between short PUCCH transmission resources and long PUCCH transmission resources of different terminals. The DL control channel may be common information for all terminals in a group or a cell, or may be dedicated information destined for a specific terminal.

At step 520, the base station receives the UL control channel from the terminal according to the short PUCCH or long PUCCH transmission time and frequency resource indicated at steps 500 or 510. Some of the steps of FIG. 5A may be skipped. For example, the base station may transmit the UL control channel configuration information to the terminal through the DL control channel at step 510, and receive the UL control channel from the terminal at step 520.

In FIG. 5B, at step 550, the terminal receives UL control channel configuration information from the base station. As described above in connection with FIGS. 4A and 4B, the UL control channel configuration information may indicate a set of OFDM symbol intervals in the time domain and PRBs in the frequency domain available for long or short PUCCH transmission, and may be received from the base station via a higher-layer signal so as to avoid a collision between short PUCCH transmission resources and long PUCCH transmission resources of different terminals.

At step 560, the terminal receives a DL control channel from the base station. As described above in connection with FIGS. 4A and 4B, the DL control channel may include a bit field that indicates an OFDM symbol interval (or start OFDM symbol and end OFDM symbol) in the time domain and a PRB in the frequency domain available to the short PUCCH or the long PUCCH and OFDM symbols unavailable to the long PUCCH transmission, and may be received from the base station so as to avoid a collision between short PUCCH transmission resources and long PUCCH transmission resources of different terminals. The DL control channel may be common information for all terminals in a group or a cell, or may be dedicated information destined for a specific terminal.

At step 570, the terminal transmits the UL control channel to the base station according to the short PUCCH or long PUCCH transmission time and frequency resource indicated by the information received at steps 550 or 560.

Figure 6:
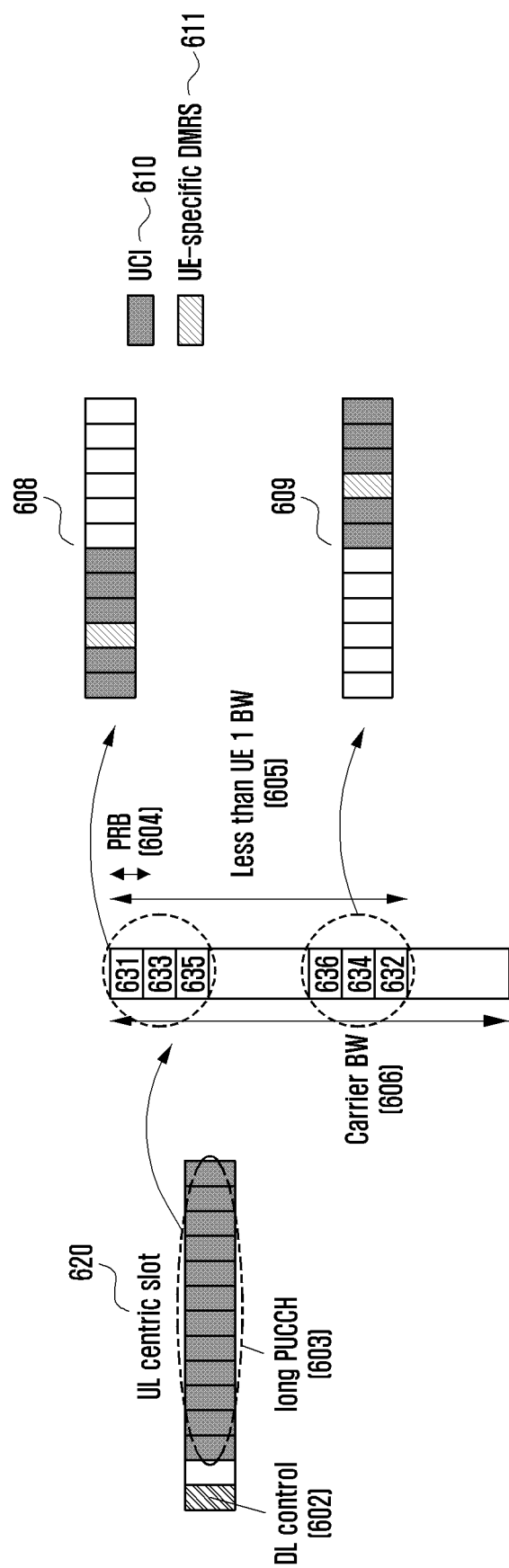
FIG. 6 is a diagram of a slot configuration, in accordance with an embodiment.

FIG. 6 is a diagram of a slot configuration, in accordance with an embodiment.

FIG. 6 shows an example in which the long PUCCH is transmitted in the time-frequency domain. 620 indicates a slot, which is a basic unit for transmission in the 5G system (a subframe or a TTI, and the basic unit for transmission is assumed to be a slot in the description), i.e., an UL centric slot whose symbols are mainly UL symbols. All or most of the OFDM symbols of the UL centric slot are used for the UL. Several initial or final OFDM symbols of the UL centric slot may be used for the UL. If both DL symbols and UL symbols are present in one slot, a transmission gap may exist between the DL symbols and the UL symbols. In the slot of FIG. 6, the first OFDM symbol is used for DL transmission (e.g., DL control channel transmission 602), the second OFDM symbol is used as a transmission gap, and the third and subsequent OFDM symbols are used for UL transmission. For UL transmission, UL data channel transmission and UL control channel transmission are possible.

For the long PUCCH 603, since the control channel of a long transmission period is used to extend the cell coverage, it can be transmitted via DFT-S-OFDM being a single carrier transmission scheme rather than OFDM transmission. Hence, the long PUCCH should be transmitted using only consecutive subcarriers. In addition, to obtain a frequency diversity effect, UL control channels of a long transmission period may be configured at some distance apart as indicated by 608 and 609. In the frequency domain, the distance 605 between the resources constituting the long PUCCH should be smaller than the bandwidth supported by the terminal. The long PUCCH in the front part of the slot may be transmitted by using PRB-1 as indicated by 608, and the long PUCCH in the rear part of the slot may be transmitted by using PRB-2 as indicated by 609. The PRB 604 is a PRB, which is a minimum transmission unit in the frequency domain, and can be defined by 12 subcarriers or the like. The frequency domain distance between PRB-1 and PRB-2 should be smaller than the maximum supported bandwidth 605 of the terminal, and the maximum supported bandwidth 605 of the terminal may be less than or equal to the bandwidth (606) supported by the system.

The frequency resources PRB-1 and PRB-2 may be configured for the terminal via a higher-layer signal or physical-layer signal. Each frequency resources may be mapped to a bit field via a higher-layer signal, and the bit field included in the d DL control channel may indicate the frequency resource to be used to the terminal. The control channel transmitted in the front part of the slot 608 and the control channel transmitted in the rear part of the slot 609 are composed of UL control information (UCI) 610 and a terminal-specific reference signal 611. It is assumed that these two signals are separated in time and transmitted via different OFDM symbols.

In addition, the originally configured frequency resources 631 and 632 may be increased according to the number of bits of the UL control information. The amount of frequency resources increased in accordance with the number of bits of the UL control information can be specified by the standard, and the terminal can determine the amount of frequency resources for the UL control information according to the specified rule. Alternatively, the amount of frequency resources corresponding to the UL control information can be configured via a higher-layer signal, and the terminal can determine the amount of frequency resources for the UL control channel on the basis of the received higher-layer signal and transmit the UL control channel by use of the frequency resources. The amount of frequency resources for transmission of the UL control information may increase within the maximum supported bandwidth 605 of the terminal. For example, the originally configured frequency resources 631 and 632 can be increased by 1 RB as indicated by 633 and 634, respectively, according to the amount of UL control information. If the amount of UL control information is further increased, the frequency resources can be increased respectively by 2 RBs as indicated by 633, 634, 635, and 636.

Figure 7:
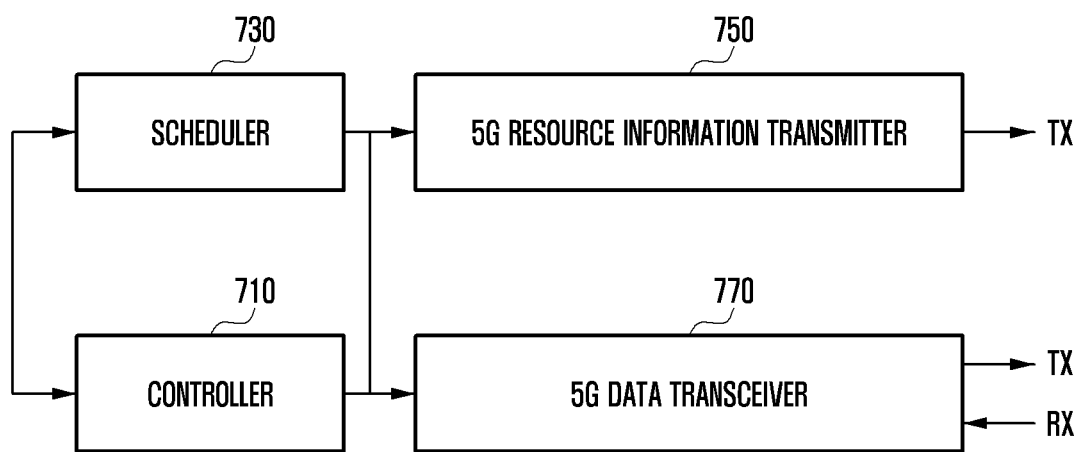
FIG. 7 is a diagram of a base station, in accordance with an embodiment.

FIG. 7 is a diagram of a base station, in accordance with an embodiment.

A controller 710 of a base station (e.g., base station 300) controls UL control channel transmission resources according to the base station procedure described in FIG. 5A, and UL control channel settings and the method of configuring time domain and/or frequency domain transmission resources for the UL control channel described in FIGS. 4A, 4B and 6. Under the control of the controller 710, a 5G resource information transmitter 750 transmits resource configuration information to a terminal by use of the 5G data transceiver 770. A scheduler 730 schedules 5G data to exchange 5G data with the terminal through the 5G data transceiver 770.

Figure 8:
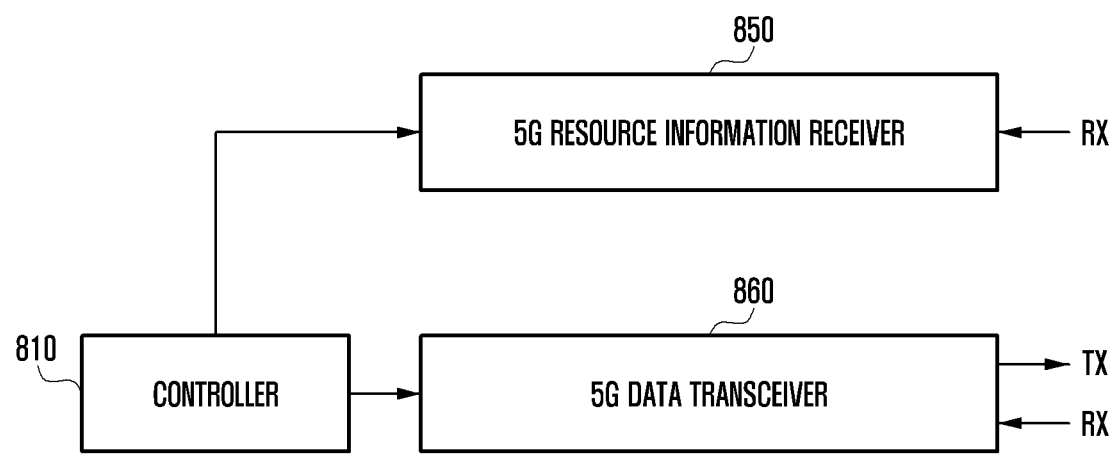
FIG. 8 is a diagram of a terminal station, in accordance with an embodiment.

FIG. 8 is a diagram of a terminal station, in accordance with an embodiment.

A terminal (e.g., terminal 320) may receive UL control channel transmission resource configuration information from the base station through a 5G resource information receiver 850 and a 5G data transceiver 860 according to the terminal procedure described in FIG. 5B, and UL control channel settings and the method of configuring time domain and/or frequency domain transmission resources for the UL control channel described in FIGS. 4A, 4B, and 6. The controller 810 may exchange scheduled 5G data (may include UL control information) with the 5G base station through the 5G data transceiver 860 at the resource location indicated by the received resource configuration information.

In accordance with the disclosure, even when a number of UL OFDM symbols changes according to the slot format, terminals can perform long PUCCH transmission based on the indicated information. Moreover, even when UL control channels such as long PUCCH, short PUCCH and SRS coexist in one slot, a resource collision between terminals is significantly reduced, and when performing long PUCCH transmission, resource utilization of the base station can be maximized.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of receiving uplink control information in a communication system, the method comprising:
   identifying a resource for receiving the uplink control information on a first uplink control channel from a terminal;
   transmitting first information associated with the resource to the terminal;
   transmitting second information associated with the resource to the terminal; and
   receiving the uplink control information on the first uplink control channel based on the first information and the second information from the terminal.

2. The method of claim 1, wherein the first information indicates the resource for the first uplink control channel, the resource being included in a slot, and
   wherein the second information indicates a resource for at least one of a sounding reference signal and a second uplink control channel in the slot.

3. The method of claim 1, wherein the first information indicates a plurality of resources for the first uplink control channel, and
   wherein the second information indicates one resource of the plurality of resources for the first uplink control channel.

4. The method of claim 1, wherein the first information indicates the resource for the first uplink control channel, and
   wherein the second information indicates a resource that has been changed in a slot for the first uplink control channel.

5. A method of transmitting uplink control information in a communication system, the method comprising:
   receiving, from a base station, first information associated with a resource for transmitting the uplink control information on a first uplink control channel to the base station;
   receiving, from the base station, second information associated with the resource;
   identifying the resource for the first uplink control channel based on the first information and the second information; and
   transmitting, to the base station, the uplink control information on the first uplink control channel on the identified resource.

6. The method of claim 5, wherein the first information indicates the resource for the first uplink control channel, the resource being included in a slot, and
   wherein the second information indicates a resource for at least one of a sounding reference signal and a second uplink control channel in the slot.

7. The method of claim 5, wherein the first information indicates a plurality of resources for the first uplink control channel, and
   wherein the second information indicates one resource of the plurality of resources for the first uplink control channel.

8. The method of claim 5, wherein the first information indicates the resource for the first uplink control channel, and
   wherein the second information indicates a resource that has been changed in a slot for the first uplink control channel.

9. A base station for receiving uplink control information in a communication system, the base station comprising:
   a transceiver; and
   a processor coupled with the transceiver and configured to:
   identify a resource for receiving the uplink control information on a first uplink control channel from a terminal,
   transmit first information associated with the resource to the terminal,
   transmit second information associated with the resource to the terminal, and
   receive the uplink control information on the first uplink control channel based on the first information and the second information from the terminal.

10. The base station of claim 9, wherein the first information indicates the resource for the first uplink control channel, the resource being included in a slot, and wherein the second information indicates a resource for at least one of a sounding reference signal and a second uplink control channel in the slot.

11. The base station of claim 9, wherein the first information indicates a plurality of resources for the first uplink control channel, and wherein the second information indicates one resource of the plurality of resources for the first uplink control channel.

12. A terminal for transmitting uplink control information in a communication system, the terminal comprising:

a transceiver; and a processor coupled with the transceiver and configured to:

receive, from a base station, first information associated with a resource for transmitting the uplink control information on a first uplink control channel to the base station;

receive, from the base station, second information associated with the resource;

identify the resource for the first uplink control channel based on the first information and the second information; and transmit, to the base station, the uplink control information on the first uplink control channel on the identified resource.

13. The terminal of claim 12, wherein the first information indicates the resource for the first uplink control channel, the resource being included in a slot, and wherein the second information indicates a resource for at least one of a sounding reference signal and a second uplink control channel in the slot.

14. The terminal of claim 12, wherein the first information indicates a plurality of resources for the first uplink control channel, and wherein the second information indicates one resource of the plurality of resources for the first uplink control channel.

15. The terminal of claim 12, wherein the first information indicates the resource for the first uplink control channel, and wherein the second information indicates a resource that has been changed in a slot for the first uplink control channel.

* * * * *